Dec. 18, 1962

V. M. MAJERUS 3,068,778

SANDWICH TOASTER

Filed Feb. 10, 1961

Vincent M. Majerus
INVENTOR.

BY Thomas A. O'Brien
and Harvey B. Jacobson
Attorneys

Dec. 18, 1962 V. M. MAJERUS 3,068,778
SANDWICH TOASTER
Filed Feb. 10, 1961 2 Sheets-Sheet 2

Vincent M. Majerus
INVENTOR.

BY *Clarence A. O'Brien*
*and Harvey B. Jackson*
Attorneys

United States Patent Office 3,068,778
Patented Dec. 18, 1962

3,068,778
SANDWICH TOASTER
Vincent M. Majerus, 211 20th Ave. SW.,
Rochester, Minn.
Filed Feb. 10, 1961, Ser. No. 88,430
3 Claims. (Cl. 99—375)

This invention relates to heating devices and particularly to a device for toasting sandwiches.

A primary object of the invention is to provide a new and improved device for toasting sandwiches.

Another object of the invention is to provide a sandwich toaster which will additionally function to trim the edges or crusts from the sandwich being toasted.

Still another object of the invention is to provide a sandwich toaster having detent means thereon which will automatically hold the toaster in either a closed or open position.

Yet another object of the invention is to provide a sandwich toaster which will make a toasted sandwich in a circular shape while at the same time sealing the edges of the sandwich all around so as to retain the ingredients thereof within the sandwich and prevent such ingredients or filling from flowing outwardly.

Still another object of this invention is to provide a sandwich toaster which has interchangeable upper and lower grids.

Still another object of the invention is to provide a sandwich toaster and which is economical to manufacture, easy to clean and maintain, and durable and reliable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 4:
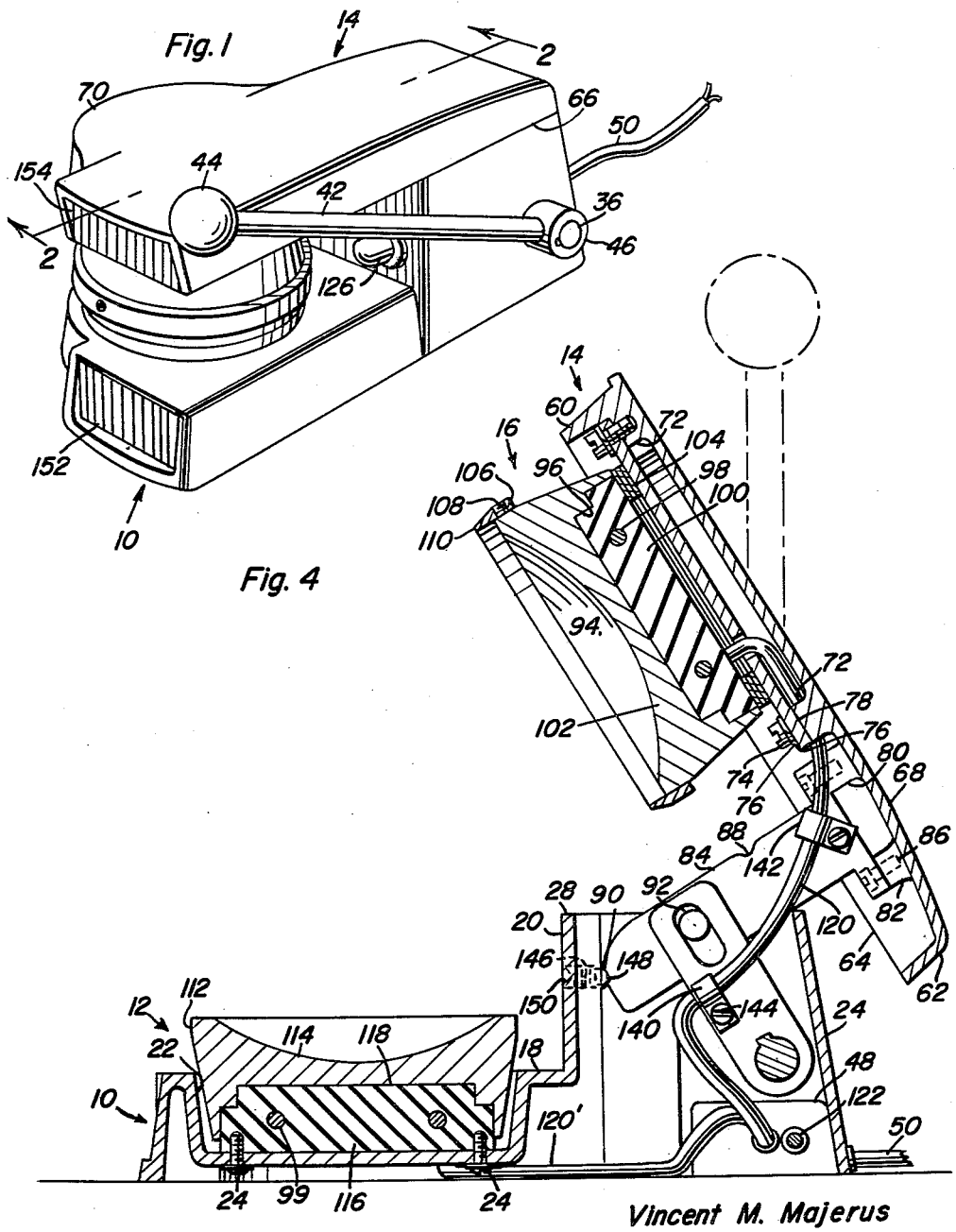
FIGURE 1 is a perspective view of my invention.
FIGURE 4 is a cross sectional view similar to FIGURE 2 but showing the toaster in an open position.

As shown in the drawings, my invention comprises a base 10 supporting a heating or toasting element 12, and a pivoted top 14 supporting a toasting element 16.

As shown in FIGURE 4, the base 10 is generally L-shaped in elevation and comprises a rectangular box-like portion 18 and a taller box-like portion 20 integral with the portion 18. The portion 18 has a circular cup-like depression 22 formed therein. The bottom of the cup portion 22 has circular bores therein for receiving screws 24 which are received by the sandwich element 12 for retaining it to the portion 18.

Figure 3:
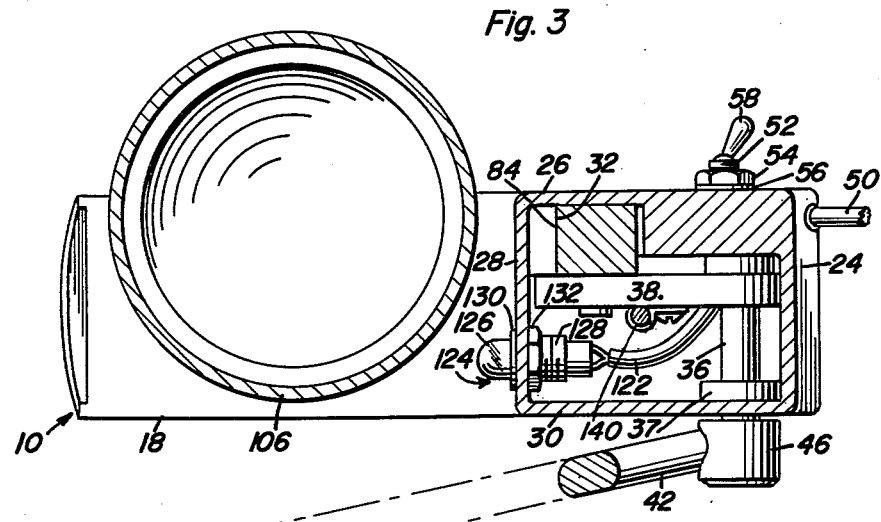
FIGURE 3 is a cross sectional view taken substantially on the plane of line 3—3 in FIGURE 2.

The base portion 20 while substantially rectangular has a sloping rear wall 24. The base portion 20 is substantially hollow and comprises the four vertically extending walls 24, 26, 28 and 30 all integrally united at their edges. As shown in FIGURE 3, the wall portion 26 is much thicker than the other wall portions and has a groove 32 formed therein. The groove 32 extends vertically upward from the bottom of the portion 28 and its upper end curves rearwardly into an enlarged portion 34.

Rotatably mounted in two aligned bores in the walls 26 and 30 is a horizontally extending shaft 36. The wall portion 30 has an inwardly extending annular bushing 37 fixed thereto for affording additional bearing surface for the shaft 36. Keyed to the shaft 36 and press fitted thereon is a normally horizontally extending arm 38. The arm 38 has an oblong slot 40 in its free end.

The shaft 36 extends outwardly through the wall 30 and has fixed to its outwardly extending end an operating handle 42 having a spherical gripping knob 44 fixed to its outer end. The inner end of the handle 42 comprises an annular hub 46 by means of which the handle is affixed to the shaft 36.

A conventional switch 48 is fixed to the rear wall 24 of the base by conventional means. The switch 48 is connected to a source of electricity by means of insulating conductor 50. The switch 48 is connected within a recess within the bottom portion of wall 26 by means of the threaded sleeve 52 extending through the wall portion and locked thereto by means of a threaded nut 54 and washer 56. The switch is operated by a conventional toggle lever 58.

The top 14 is also generally rectangular in shape and comprises front wall 60, rear wall 62 and side walls 64 and 66 all integrally connected to each other and to the edges of the rectangular top portion 68. The side wall 64 curves outwardly near its front end to form a semi-circular projection 70 as shown in FIGURE 1. The top 68 also extends outwardly in this area to conform to the shape of the projection 70. The top 68 has a circular flange 72 integrally formed therewith and extending downwardly from its inner or under side. Secured to the annular flange 72 by means of plurality of spaced screws 74 and lock washers 76 is a circular plate 78, which supports the heating element 16.

Also integrally formed with the top 68 and extending downwardly from its underside near its rear portion are two parallel lugs 80 and 82 which support a T-shaped guide 84. The guide 84 contains recessed bores for receiving the screws 86 in their heads shown in FIGURE 4. The screws 86 extend into the lugs 80 and 82 for maintaining the guide 84 thereon. As shown in FIGURE 3, the guide 84 is substantially rectangular in cross-section and has two concave recesses 88 and 90 therein. The lower portion of the guide 84 has fixed thereto a horizontally extending pin 92 which projects through the oblong slot 40 in the arm 38.

The heating or toasting assembly 16 is of generally cylindrical shape but its sides or peripheral walls converge in an upward direction slightly. The lower end wall has a part spherical concave recess 94 therein, and its upper end has a cup-shaped recess 96 therein for receiving a heating element which comprises a high resistance heating conductor 98 embedded in a heat resisting insulating material 100 which fills the recess 96 and effectively electrically insulates heating elements 98 from the toaster member 102.

The insulator ring 104 separates the toaster assembly 16 from the circular plate 78. The plate 78 is secured to the assembly 16 by means of screws 24, not shown, which extend through the plate, the ring 104 and into the insulator and disk 100 in a manner similar to the manner in which the toaster element 12 is attached to the base member 18.

An annular cutter ring 106 surrounds the lower edge of the assembly 16 and is secured thereto by means of a plurality of spaced setscrews 108. The lower edge of the ring 106 is beveled to form a relatively sharp edge 110.

The lower toaster assembly 12 comprises a substantially cylindrical member 112 having a part spherical recess 114 therein and a cup-shaped recess 118 in its lower edge filled with insulating material 116 which contains heating coils 99 like those shown at 98. The coils 99 are energized by a conductor 120' which is a branch of conductor 120.

Figure 2:
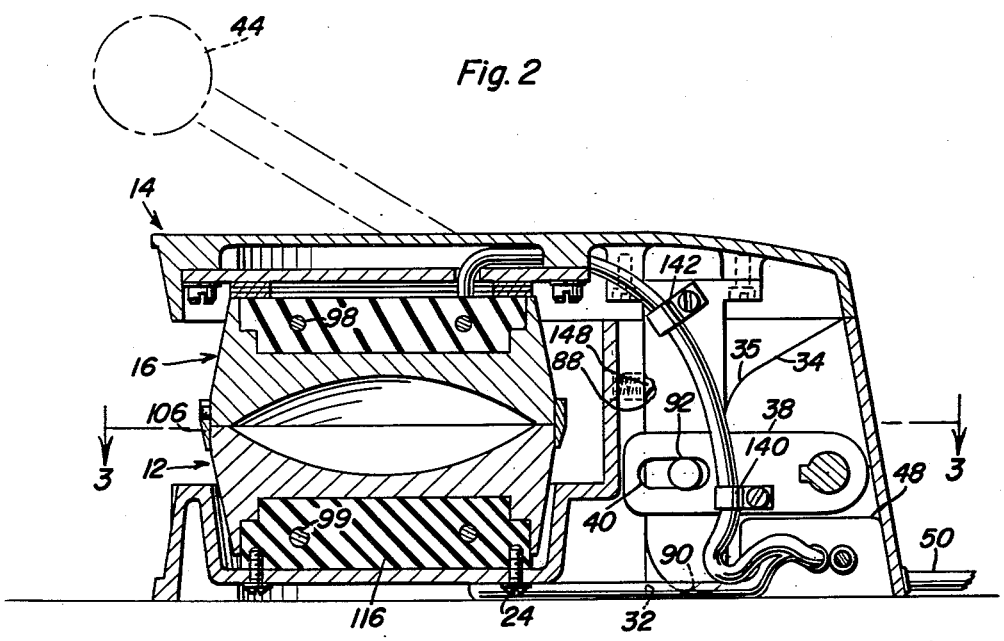
FIGURE 2 is a cross sectional elevational view taken substantially on the plane of line 2—2 of FIGURE 1.

The assemblies 12 and 16 are of exactly the same size and shape and are interchangeable. While the assembly 16 may be the only one which is actually heated by electric means, it is also desirable that the lower assembly 12 also be so heated as shown in FIGURE 2.

The resistance heater element 98 is connected to the insulated conductor 120 which in turn is connected to the conductor 50 by means of the switch 48. The switch is also connected by means of an insulator conductor 122 to an indicator light 124 which becomes energized, thereby indicating whether or not the assemblies 16 and 12 is being heated. The light 124 is conventional and comprises a bulb 126 mounted in a threaded sleeve 128 which extends through the wall 28 and is connected thereto by flange 130 and threaded nut 132.

The conductor 120 is maintained in proper positioning by fastening elements or clamps 140, and 142 which are retained in position by screws 144.

Mounted in a horizontally extending bore 146 in the wall 28 is a detent member 148 urged inwardly toward guide 84 by means of coil spring 146.

As shown in FIGURE 1, the front portion of the base 10 and top 14 are recessed at 152 and 154. These recesses may contain decorative material such as colored plastic.

In operating my device, the conductor 50 is connected to a source of electricity by means such as a conventional plug. Then the toggle switch 58 is operated so as to connect the conductor 50 to the heater elements 98 and 99 for heating the cylindrical elements 102 and 112. At the same time, the indicating light 124 will be energized to signify that the sandwich toaster is in operation. The handle knob 44 is then rotated in a clockwise direction about the shaft 36 as viewed in FIGURE 1 so as to raise the top assembly 14 to the position shown in FIGURE 4. Rotation of the handle knob 44 rotates shaft 36 which in turn rotates arm 38 in a clockwise direction. Arm 38 initially moves guide member 84 in a upward direction in the vertically extending portion of guide slot 32, by means of a pin 92 engaging the side walls of oblong slot 40. Once the pin 92 reaches the elevation of the curved portion 35 of the slot 32, detent 148 and spring 146 urge the guide 84 to pivot in a clockwise direction about the pin 92 so that the guide follows the surface 35 and enlarged portion 34. When the top is fully opened as illustrated in FIGURE 4, the back side of guide 84 is resting upon the surface 35 of the slot 32 and detent 148 engages the recess 90 for retaining the top in the top position. A sandwich is then inserted into the concave recess 114, and then the arm 42 is moved in a clockwise direction by means of a knob 44 until the annular edge 110 of the cutting ring 106 engages the top surface of the sandwich. Further pressure on the knob 44 causes edge 110 to cut the edging or crust from around the sandwich, and as can be seen by inspection of FIGURE 2, the particular shape of the recesses 114 and 94 compress the edges of the sandwich together for sealing the contents thereof within the sandwich. In the fully closed position, the elements 102 and 112 are in abutting relationship as shown in FIGURE 2 and the detent 148 is mated with the recess 88 for holding the top in its fully closed position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sandwich toaster comprising, a substantially rectangular base consisting of a front section having a circular cup-like depression formed therein, and a raised hollow rear section; a top conforming in shape to the rectangular base, the rear section of said top adapted to rest on the raised rear section of the base; pivot means secured to the rear section of the top in alignment with the hollow rear section of the base, said pivot means also secured to the base within the hollow rear section; a first sandwich receptacle supported within the circular depression formed in the front section of the base and extending above the upper surface of said front section; a second sandwich receptacle secured to the top and extending downwardly therefrom in alignment with said first sandwich receptacle, said receptacles extending from their supports a sufficient distance so as to contact each other when the rear section of the top rests on the raised rear section of the base; heating elements supported adjacent said receptacles, switch means operatively connecting the heating elements to a conventional source of power, an indicator light secured to said switch means, said light being lit upon the introduction of current into the heating element thus indicating when said elements are being heated; a removable annular cutter ring secured to the lower edge of the upper sandwich receptacle and extending therebelow so as to overlap the edge of the bottom sandwich receptacle thereby severing any excess material extending beyond said edges; said pivot means includes a rotatable horizontal shaft secured within the hollow rear section between the side walls thereof, an elongated arm having one end fixedly secured to the horizontal shaft and rotatable therewith, the second end of said arm having an elongated slot therein, an elongated guide member secured at its upper end to the top and extending vertically into the hollow section of the base when the rear section of the top rests on the raised rear section of the base, a horizontally extending pin on said guide member at approximately the same height as the horizontal shaft when the rear section of the top rests on the raised section of the base, said pin being rotatably and slidably secured with the arm slot, one end of the horizontal shaft extending beyond one side wall of the rear section, and an operating handle fixedly secured to said shaft for rotation thereof.

2. A device as defined in claim 1 including a spring-loaded detent member secured to the front wall of the hollow rear section and extending into contact with the guide member, said guide member including two recesses for locking engagement with said detent member, one of said recesses located in the forward face of the guide member so as to lock the top in a first position with the rear section thereof resting on the raised rear section of the base, and the second recess located in the bottom of the guide member so as to lock the top in a second position with the rear section thereof located upwardly and outwardly from the raised rear section of the base.

3. A sandwich toaster comprising, a substantially rectangular base consisting of a front section having a circular cup-like depression formed therein, and a raised hollow rear section; a top conforming in shape to the rectangular base, the rear section of said top adapted to rest on the raised rear section of the base; pivot means secured to the rear section of the top in alignment with the hollow rear section of the base, said pivot means also secured to the base within the hollow rear section; a first sandwich receptacle supported within the circular depression formed in the front section of the base and extending above the upper surface of said front section; and a second sandwich receptacle secured to the top and extending downwardly therefrom in alignment with said first sandwich receptacle, said receptacles extending from their supports a sufficient distance so as to contact each other when the rear section of the top rests on the raised rear section of the base; one of said receptacles having a severing edge thereon and extending therefrom so as to overlap the edge of the other receptacle thereby severing any excess material extending beyond said edges; heating elements supported adjacent said receptacles, switch means operatively connecting the heating elements to a conventional source of power; said pivot means includes a rotatable horizontal shaft secured within the hollow rear section between the side walls thereof, an elongated arm having one end fixedly secured to the horizontal shaft and rotatable therewith, the second end of said arm having an elongated slot therein, an elongated guide member secured at its upper end to the top and extending vertically into the hollow section of the base when the rear section of the top rests on the raised rear section of the base, a horizontally extending pin on said guide member at approximately the same height as the horizontal shaft when the rear section of the top rests on the raised section of the base, said pin being rotatably and slidably secured with the arm slot, one end of the horizontal shaft extending beyond one side wall of the rear section, and an operating handle fixedly secured to said shaft for rotation thereof.

References Cited in the file of this patent

UNITED STATES PATENTS

| | | |
|---|---|---|
| 1,245,008 | Moore | Oct. 30, 1917 |
| 1,257,513 | Messmer | Feb. 26, 1918 |
| 2,587,314 | Hall | Feb. 26, 1952 |